United States Patent
Kim et al.

(10) Patent No.: US 8,777,192 B2
(45) Date of Patent: Jul. 15, 2014

(54) THREE POINT SUPPORTING BUSH TYPE HYDROMOUNT

(75) Inventors: Hyo-Seok Kim, Kwangmyung-shi (KR); Hyun-Chul Sohn, Kimhe-shi (KR)

(73) Assignees: Hyundai Motor Company, Seoul (KR); Kia Motors Corporation, Seoul (KR); Daeheung R&T Co., Ltd., Kimhe-Shi (KR)

( * ) Notice: Subject to any disclaimer, the term of this patent is extended or adjusted under 35 U.S.C. 154(b) by 54 days.

(21) Appl. No.: 13/194,752

(22) Filed: Jul. 29, 2011

(65) Prior Publication Data

US 2012/0074628 A1    Mar. 29, 2012

(30) Foreign Application Priority Data

Sep. 28, 2010    (KR) .................. 10-2010-0093745

(51) Int. Cl.
*F16F 13/00*    (2006.01)

(52) U.S. Cl.
USPC .................. 267/140.12; 267/219; 267/141.2

(58) Field of Classification Search
USPC ............ 267/140.12, 140.13, 219, 293, 122, 267/141.2, 141.6, 140.11
See application file for complete search history.

(56) References Cited

U.S. PATENT DOCUMENTS

| | | | | |
|---|---|---|---|---|
| 4,728,086 A * | 3/1988 | Ishiyama et al. | ......... | 267/140.12 |
| 4,872,650 A * | 10/1989 | Tabata et al. | ............. | 267/140.12 |
| 4,884,789 A * | 12/1989 | Takeda et al. | ............ | 267/140.12 |
| 4,895,353 A * | 1/1990 | Roth et al. | ............... | 267/140.12 |
| 5,035,407 A * | 7/1991 | Takeguchi et al. | ........ | 267/140.12 |
| 5,037,073 A * | 8/1991 | Matsumoto et al. | ..... | 267/140.12 |
| 5,040,774 A * | 8/1991 | Veverka et al. | .......... | 267/140.12 |
| 5,188,346 A * | 2/1993 | Hamada et al. | .......... | 267/140.12 |
| 5,215,292 A * | 6/1993 | Ishiyama et al. | ......... | 267/140.12 |
| 5,370,376 A * | 12/1994 | Ishiyama | ................. | 267/140.12 |
| 6,669,181 B2 * | 12/2003 | Someya et al. | .......... | 267/140.12 |
| 7,192,013 B2 * | 3/2007 | Miyahara | .................. | 267/140.12 |
| 7,275,738 B2 * | 10/2007 | Minamisawa | ........... | 267/140.12 |

FOREIGN PATENT DOCUMENTS

| | | |
|---|---|---|
| JP | 10-252812 A | 9/1998 |
| JP | 10-311362 A | 11/1998 |
| JP | 2000-136843 A | 5/2000 |
| JP | 2009-74610 A | 4/2009 |

* cited by examiner

*Primary Examiner* — Thomas J Williams
*Assistant Examiner* — Mariano Sy
(74) *Attorney, Agent, or Firm* — Morgan, Lewis & Bockius LLP

(57) ABSTRACT

A hydromount absorbs and alleviates vibration of driving components such as an engine, a power train, a transmission, and the like of a vehicle, and more particularly, to a three point supporting hydromount in which inner pipes are disposed in a horizontal direction of a vehicle frame.

1 Claim, 9 Drawing Sheets

THREE POINT SUPPORTING BUSH TYPE HYDROMOUNT

CROSS-REFERENCE TO RELATED APPLICATIONS

This application claims priority under 35 U.S.C. §119 to Korean Patent Application No. 10-2010-93745, filed on Sep. 28, 2010, the entire contents of which application is incorporated herein for all purposes by this reference.

BACKGROUND OF INVENTION

1. Field of Invention

The present invention relates to a hydromount absorbing and alleviating vibration of driving components such as an engine, a power train, a transmission, and the like of a vehicle, and more particularly, to a three point supporting bush type hydromount in which inner pipes are disposed in a horizontal direction of a vehicle frame.

2. Description of Related Art

In general, suspension parts of a vehicle act to control displacement and perform a vibration-proof operation for a power plant including an engine and a transmission.

Vibration phenomena of the vehicle include the shaking of a vehicle body when the engine starts and stops, the vibration of the vehicle body in idling, the vibration of the vehicle body when the engine is in high RPM, the vibration by a bump, the shaking of the vehicle body when a high load is given, an impact when a sudden change occurs in acceleration or shifting, interference and breakage by excessive displacement, etc.

Origins of the vibration include a torque fluctuation when the engine is in low RPM, the vibration of a power plant by inertial force and couple force by rotary motion of a crank shaft when the engine is in low RPM, and the vibration of a power plant by couple force and thrust force by a driving system joint angle, etc., in the case of a low-frequency region (30 Hz or less).

In addition, the origins of the vibration include the vibration of a power plant by inertial force and couple force by rotary motion of the crank shaft when the engine in high RPM, the engagement vibration of gears in the transmission, the vibration of a cylinder block in combustion, the moving valve system vibration of an engine, the bending of a crank shaft, torsional vibration, the bending of a power plant, etc., in the case of a high-frequency region (30 Hz or more).

The vibration causes noise and the noise is transferred up to the interior of the vehicle via the vehicle body to be a chief cause in deteriorating ride comfort.

Therefore, when driving components such as the engine, the power train, the transmission, etc. are mounted on an engine room, a mount capable of supporting the driving components while withstanding their weights and absorbing and alleviating vibration so as to transfer minimum vibration to the vehicle body is mounted.

Since the mount should alleviate/absorb the vibrations of the driving components and withstand load weights of the driving components, the mounting locations, the number, and the structures of the mounts are designed by considering the weights, structures, chasses, body structures, etc. of the driving components.

When the mounts support the engine, the power train, and the transmission, the mounts are referred to as an engine mount, a power train mount, and a transmission mount, respectively. The engine of the vehicle including the transmission is connected to lower and side frames of the vehicle body by the mounts.

The structure of the mount is divided into a rubber mount and a hydromount (hydraulic mount).

The rubber mount has a structure in which elastic rubber is interposed between an upper plate and a lower plate and damps vibration and noise by using the elastic rubber.

The hydromount includes a liquid chamber part and a space part of a diaphragm, and has a structure in which a liquid chamber of the liquid chamber part is pressed to store fluids in the diaphragm through an orifice and damps vibration and noise through the fluids.

The mount used particularly for the transmission among the mounts is mounted on the vehicle body in a four point inertial supporting method or a three point inertial supporting method. In the mount mounted in the four point inertial supporting method, a mounting direction of an inner pipe of the mount is a forward and backward direction of the vehicle, while as shown in an outline diagram of a known three point inertial mount of FIGS. 1A and 1B and a perspective view of the known three point inertial mount of FIG. 2, a direction of an inner pipe 102 of the mount 101 mounted on a vehicle frame 100 in a three point inertial supporting method is a horizontal direction of the vehicle frame 100 in order to enhance noise and vibration and an amount of forward and backward rubber when the vehicle is accelerated. Therefore, since the three point mount has mounting locations less than the four point mount by one, the structure of the three point transmission mount needs to be designed as the hydromount structure in order to solve a disadvantage in which ride comfort is relatively worse as the movement of the transmission is larger.

However, when the direction of the inner pipe of the hydromount is designed as the horizontal direction of a vehicle, since the inner pipe cannot withstand excessive input in the forward and backward direction of the vehicle, the diaphragm formed by a thin film having low hardness, which is provided in the mount, is broken due to lack of durability, and as a result, the hydromount may lose the hydromount function.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a three point inertial supporting bush type hydromount in which inner pipes are disposed in a horizontal direction of a vehicle frame.

Various aspects of the present invention also provide for a three point supporting bush type hydromount, the hydromount including a diaphragm unit having a diaphragm formed by a rubber curing method in an inner part of a bobbin-shaped outer pipe, a main rubber part having an inner pipe formed by the rubber curing method in an inner part of a bobbin-shaped saddle stitching portion which press-fits in the diaphragm unit, and a main liquid chamber, and a diaphragm cover bound between the main liquid chamber and the diaphragm to protect the diaphragm and forming an orifice that allows fluids to flow.

Effects of a three point supporting bush type hydromount according to various aspects of the present invention having the above-mentioned configuration are as follows.

First, a diaphragm which is a fluid storage of the hydromount of the present invention is positioned in a lower part of a main liquid chamber and a diaphragm cover is interposed between the lower part of the main liquid chamber and the diaphragm, such that a stopper function to control a large displacement of a main rubber part is provided by the diaphragm cover and a possibility of fracture of the diaphragm of the hydromount by a forward and backward load pointed out as a known problem is remarkably reduced to protect the diaphragm.

Second, in the hydromount of the present invention, rubber is filled in both space parts of an upper part of the main liquid chamber to reduce acceleration penetration noise and a shock/jerk when a vehicle is accelerated and decelerated.

Third, a space to increase a rubber amount is ensured in a rear part of the vehicle where large acceleration displacement occurs a lot by placing an orifice formed by the diaphragm cover of the hydromount of the present invention eccentrically in front of the vehicle, such that a structure to further improve a vibration damping effect is provided.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a configuration of a three point supporting bush type hydromount according to various embodiments of the present invention will be described in detail with reference to the accompanying drawings.

However, the accompanying drawings are provided as examples in order to fully transfer the spirit of the present invention to those skilled in the art. Therefore, the present invention is not limited to the accompanying drawings and may be implemented in various forms.

Further, unless terms are defined, they have meanings understood by those skilled in the art and known functions and configurations which may unnecessarily obscure the scope of the present invention will not be described in the following description and accompanying drawings.

Figure 1A:
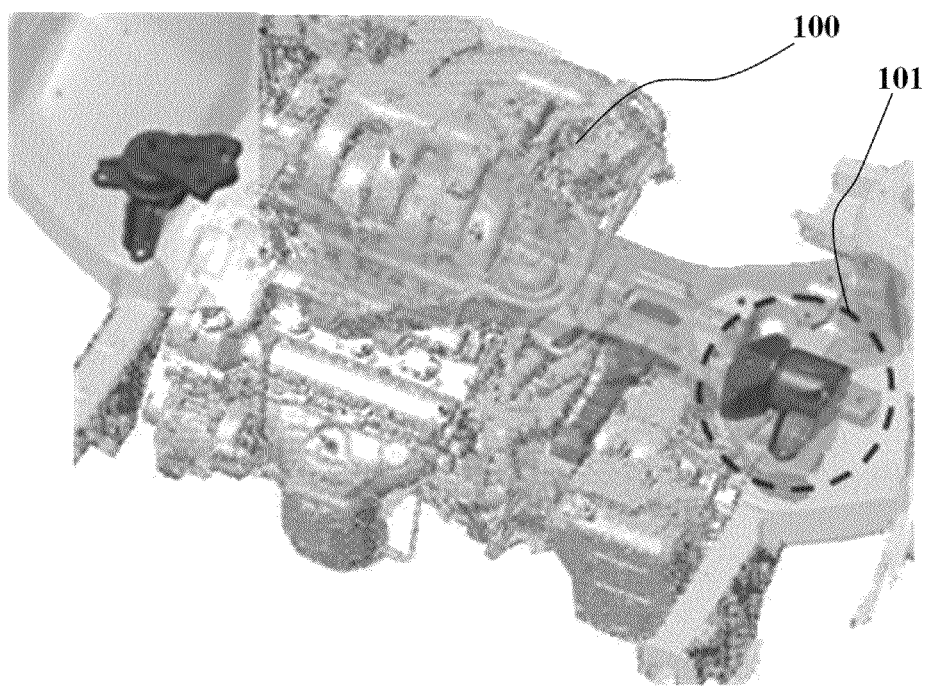
FIGS. 1A and 1B are diagram showing a state when a known three point supporting type mount is mounted.
Figure 1B:
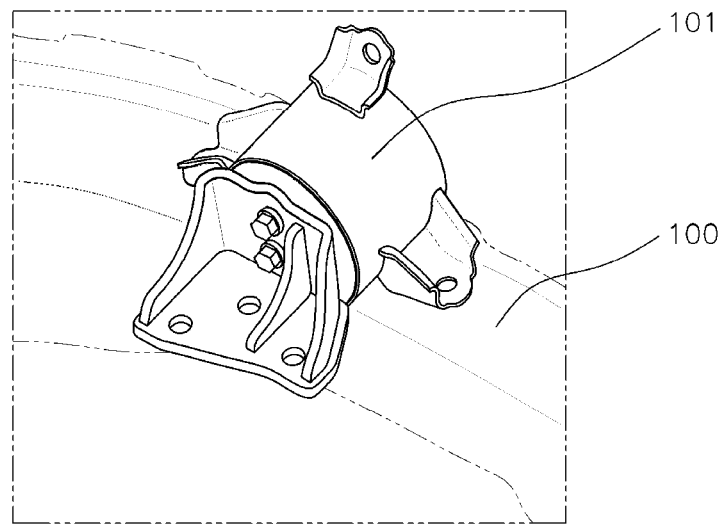
Figure 2:
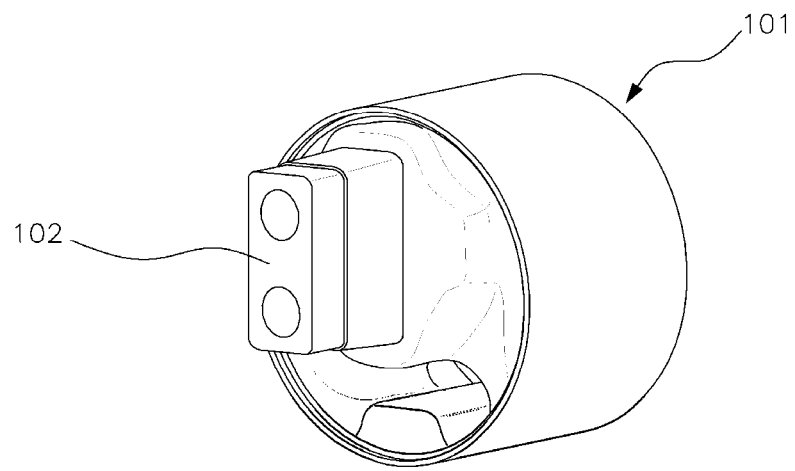
FIG. 2 is a perspective view of a mount used in a known three point supporting type.
Figure 3:
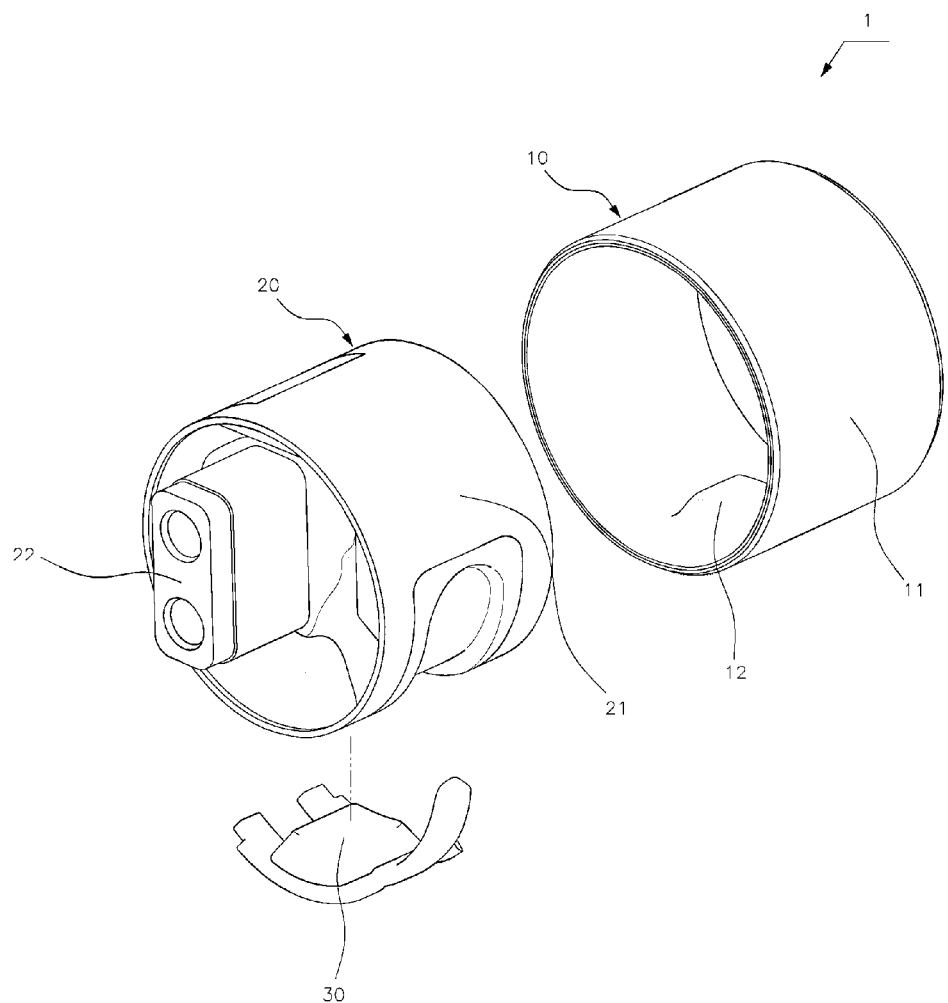
FIG. 3 is an exploded perspective view of an exemplary three point supporting bush type hydromount according to of the present invention.
Figure 4:
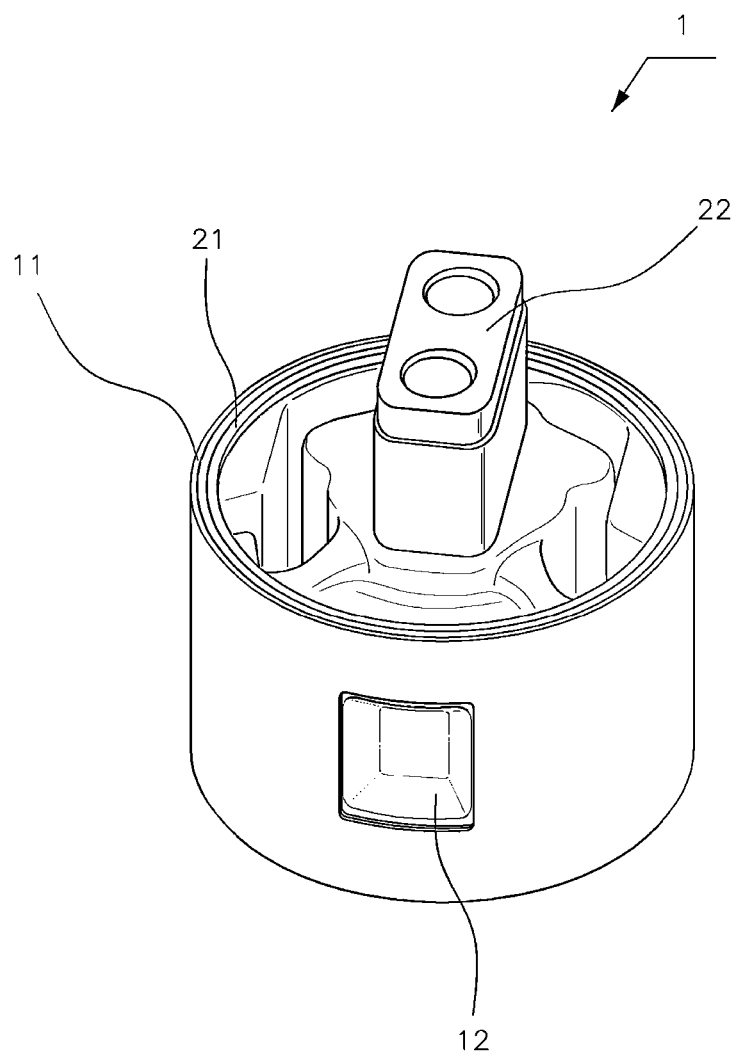
FIG. 4 is a bottom perspective view of an exemplary three point supporting bush type hydromount according to the present invention.

FIG. 3 is an exploded perspective view of a three point supporting bush type hydromount according to various embodiments of the present invention and FIG. 4 is a bottom perspective view of an assembling state of the three point supporting bush type hydromount according to various embodiments of the present invention.

Referring to FIGS. 3 and 4, the hydromount 1 according to various embodiments of the present invention includes a diaphragm unit 10 having a diaphragm 12 formed by a rubber curing method in an outer pipe 11 having a bobbin shape which is a cylindrical shape in which an upper portion and a lower portion are opened, and a main rubber part 20 having an inner pipe 22 formed by the rubber curing method in a bobbin-shaped saddle stitching portion 21.

The configuration of the hydromount according to various embodiments of the present invention is different from a configuration of a known hydromount in which rubber is not cured in the outer pipe and the diaphragm is cured integrally with the main rubber part to have the same hardness and material as the main rubber part.

Further, the hydromount according to various embodiments of the present invention includes a diaphragm cover 30 attached between a lower part of the saddle stitching portion 21 and the diaphragm 12 to form an orifice that allows fluids to flow while protecting the diaphragm 12.

The diaphragm unit 10 and the main rubber part 20 are each manufactured, the diaphragm cover 30 is bound to a lower part of the main rubber part 20 and the fluids are filled therein, and the main rubber part 20 press-fits in the diaphragm unit 10 to assemble the hydromount according to various embodiments of the present invention. In this case, for improvement of performance such as prevention of leakage of the fluids or increase in durability, a swaging process may be performed after the assembly.

In this case, the diaphragm unit 10 and the main rubber part 20 may be different from each other in a material and hardness of used rubber.

Figure 5:
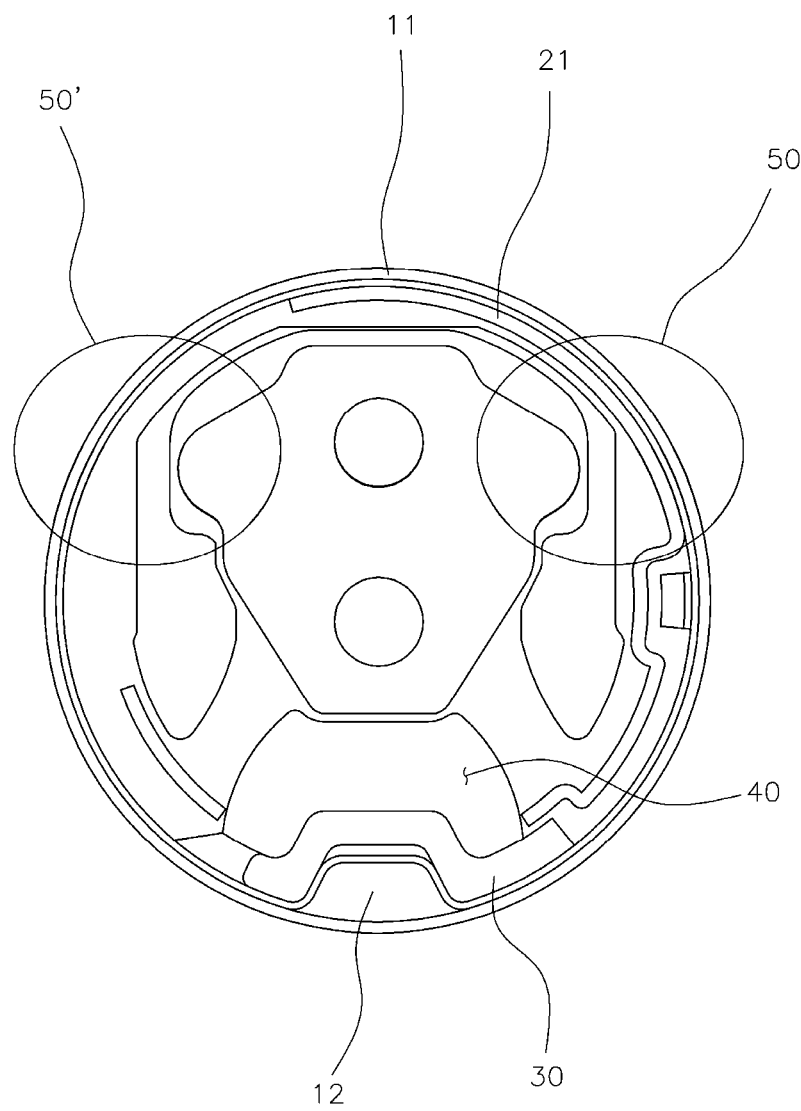
FIG. 5 is a cross-sectional view of an exemplary three point supporting bush type hydromount according to the present invention.

FIG. 5 is a cross-sectional view of the hydromount according to various embodiments of the present invention. As shown in the figure, the hydromount according to various embodiments of the present invention has a structure different from the known hydromount.

That is, in the known hydromount, the liquid chamber is positioned in a lower part of a bush or bushing and the diaphragms are positioned in two locations such as left and right parts of an upper part of the bush, while in the hydromount according to various embodiments of the present invention, the lower liquid chamber of the known hydromount is divided into two chambers, and the upper chamber acts as a main liquid chamber part and the diaphragm cover 30 having a function as a stopper for controlling large displacement of the main rubber part in order to improve durability, a function to protect the diaphragm, and a function to configure the orifice, which is formed in the middle thereof.

The main rubber part 20 of the three point supporting hydromount according to various embodiments of the present invention includes a main liquid chamber 40 formed in a lower part of the inner pipe 22 by the rubber curing method. Therefore, in the hydromount according to various embodiments of the present invention, the diaphragm 12 positioned on upper left and right ends of the known inner pipe is positioned in a lower part of the main liquid chamber 40 and an orifice having a predetermined length is provided between the main liquid chamber 40 and the diaphragm 12.

Further, rubber that plays a buffering role when the vehicle is accelerated or decelerated is filled in both space parts 50 and 50' of the inner pipe 22 in an upper part of the main liquid chamber 40 so as to improve acceleration penetration noise and reduce a shock/jerk.

Figure 6:
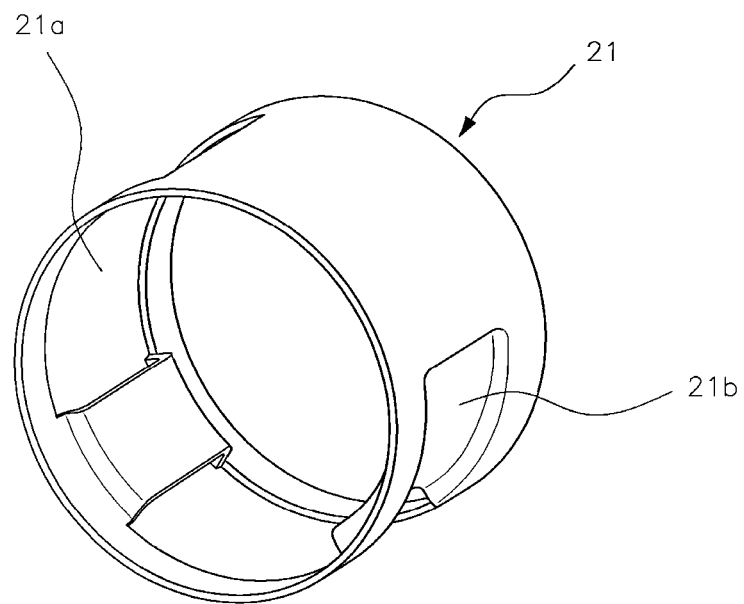
FIG. 6 is a perspective view of a saddle stitching unit of an exemplary three point supporting bush type hydromount according to the present invention.
Figure 7:
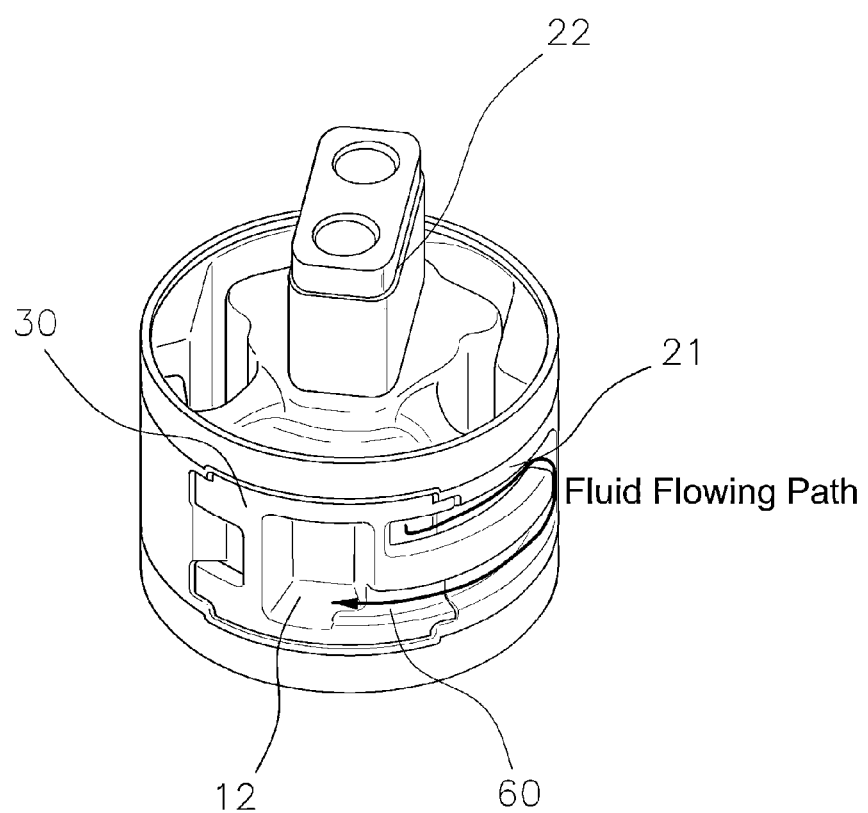
FIG. 7 is a partial cut-away view of an exemplary three point supporting bush type hydromount according to the present invention.

FIG. 6 is a perspective view of a saddle stitching portion 21 of the hydromount according to various embodiments of the present invention and FIG. 7 is a partial cut-away diagram of the three point supporting bush type hydromount according to various embodiments of the present invention.

Referring to the figures, the saddle stitching portion 21 has a bobbin shape and includes a first through-hole 21a formed on one side surface and a second through-hole 21b formed from the other side surface to the bottom thereof. The first through-hole 21a has a rubber filling space to improve vibration damping and absorption efficiencies in an acceleration section.

Further, as shown in FIG. 7, the diaphragm cover 30 is attached to a lower part of the second through-hole 21b to provide an orifice 60 forming a path of fluids between the main liquid chamber 40 and the diaphragm 12.

In this case, the orifice is eccentrically disposed in front of the vehicle, considering that large displacements of most of the movement directions are inputted in a rear direction of the vehicle when the vehicle is operated and the resulting shock and acceleration penetration sound are generated, and the orifice is eccentrically disposed in a front direction of the vehicle in order to reflect a structure in which rubber is primarily filled in a rear part of the vehicle.

Figure 8:
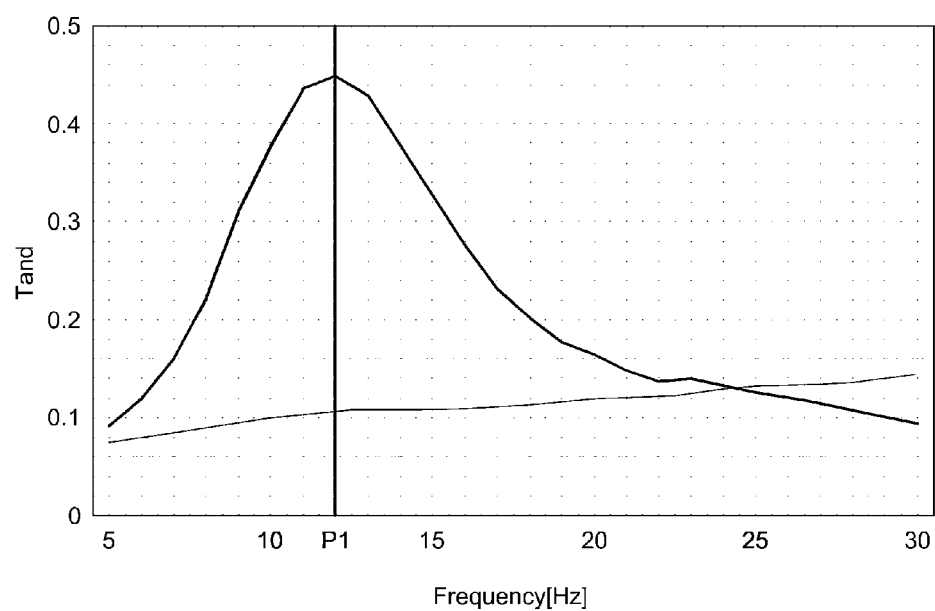
FIG. 8 is a comparison graph of the vehicle vertical damping performance of an exemplary three point supporting bush type hydromount according to the present invention.
Figure 9:
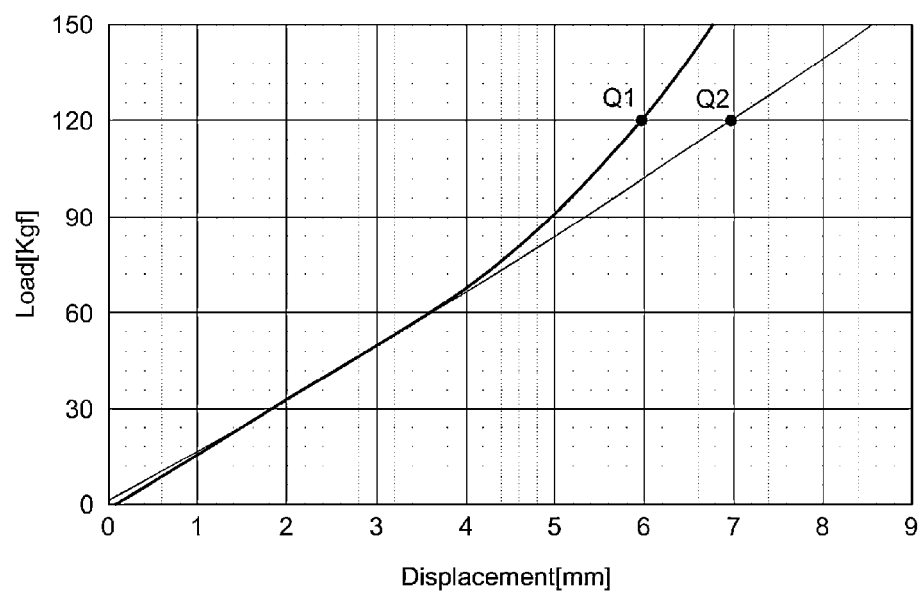
FIG. 9 is a comparison graph of a vehicle forward and backward characteristic of a static spring of an exemplary three point supporting bush type hydromount according to the present invention.

FIG. 8 is a comparison graph of the vehicle vertical damping performance of the three point supporting bush type hydromount according to various embodiments of the present invention and FIG. 9 is a comparison graph of a vehicle forward and backward characteristic of a static spring of the three point supporting bush type hydromount according to various embodiments of the present invention.

As shown in the graph of FIG. 8, when the vehicle vertical damping performance of the hydromount according to various embodiments of the present invention is compared with that of the known rubber mount, a value of tan δ indicating the damping force of the mount is approximately 0.1 in the known rubber mount at a resonance point P1, while approximately 0.44 in the hydromount according to various embodiments of the present invention. Therefore, the hydromount according to various embodiments of the present invention is has a damping characteristic approximately 4 times higher than the known rubber mount and the high damping characteristic shows that the hydromount according to various embodiments of the present invention can suppress vibration in resonance of a vehicle shaft and improve driving ride comfort.

Further, as shown in the graph of FIG. 9, when a vehicle forward and backward static spring characteristic of the hydromount according to various embodiments of the present invention is compared with that of the known rubber mount, the hydromount according to various embodiments of the present invention has the smaller displacement (a horizontal axis of the graph) when the hydromount has the same load (a vertical axis of the graph). For example, when the load is 120 Kgf, the displacement of the hydromount according to various embodiments of the present invention is 6 mm at point Q1, while the displacement of the known rubber mount is 7 mm at point Q2. Therefore, since the displacement of the hydromount according to various embodiments of the present invention is smaller under the same load, a vibration suppression effect is larger and a possibility of fracture of the diaphragm of the hydromount by a forward and backward load pointed out as a known problem is remarkably reduced.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydromount for a vehicle, the hydromount comprising:
   an outer pipe;
   a diaphragm unit having a diaphragm formed by a rubber curing method in an inner part of the outer pipe wherein the diaphragm divides an inner space of the outer pipe into a first space and a second space;
   a main rubber part disposed in the first space, and having:
      a saddle stitching portion including a first through-hole formed on one side surface and a second through-hole formed from an other side surface to a bottom thereof;
      an inner pipe formed by the rubber curing method in an inner part of the saddle stitching portion mounted in the diaphragm unit; and
   a main liquid chamber formed in the first space between the outer pipe and the main rubber part; and
   a diaphragm cover disposed in the first space and bound between the main liquid chamber and the diaphragm to protect the diaphragm;
   wherein an orifice is provided to fluid-connect the main liquid chamber and the second space enclosed by the outer pipe and the diaphragm to continuously allow fluid-communication between the main liquid chamber and the space;
   wherein a rubber material is attached to both sides of the inner pipe in an upper part of the main liquid chamber;
   wherein the orifice is disposed along a front direction of the vehicle; and
   wherein the diaphragm cover is attached to a lower part of the second through-hole to provide the orifice.

* * * * *